United States Patent
Liang

(10) Patent No.: US 7,480,082 B2
(45) Date of Patent: Jan. 20, 2009

(54) RADIATION IMAGE SCANNING APPARATUS AND METHOD

(75) Inventor: Rongguang Liang, Penfield, NY (US)

(73) Assignee: Carestream Health, Inc., Rochester, NY (US)

( * ) Notice: Subject to any disclaimer, the term of this patent is extended or adjusted under 35 U.S.C. 154(b) by 1023 days.

(21) Appl. No.: 10/814,884

(22) Filed: Mar. 31, 2004

(65) Prior Publication Data

US 2005/0218353 A1    Oct. 6, 2005

(51) Int. Cl.
*H04N 1/04* (2006.01)
*H04N 1/46* (2006.01)
*H01L 27/00* (2006.01)

(52) U.S. Cl. ............... 358/474; 358/505; 250/208.1
(58) Field of Classification Search .......... 250/208.1; 348/308, 374, 294; 359/385; 358/474, 475, 358/509, 510, 513, 480, 482, 471, 507, 505, 358/484
See application file for complete search history.

(56) References Cited

U.S. PATENT DOCUMENTS

| | | | |
|---|---|---|---|
| 4,949,172 A * | 8/1990 | Hunt et al. ............. | 348/88 |
| 5,760,834 A | 6/1998 | Rostoker | |
| 5,822,125 A | 10/1998 | Meyers | |
| 5,955,725 A * | 9/1999 | Cattorini ............ | 250/208.1 |
| 6,285,400 B1 * | 9/2001 | Hokari ............ | 348/374 |
| 6,373,074 B1 | 4/2002 | Mueller et al. | |
| 6,665,012 B1 * | 12/2003 | Yang et al. ............ | 348/308 |
| 6,767,122 B2 * | 7/2004 | Honguh et al. ............ | 362/555 |
| 6,770,862 B1 * | 8/2004 | Maciuca et al. ......... | 250/208.1 |
| 6,825,869 B2 * | 11/2004 | Bang ............ | 347/250 |
| 2001/0009414 A1 * | 7/2001 | Badyal et al. ............ | 345/163 |
| 2001/0028047 A1 | 10/2001 | Isoda | |
| 2002/0027708 A1 * | 3/2002 | Lin et al. ............. | 359/385 |
| 2002/0040972 A1 | 4/2002 | Arakawa | |
| 2002/0056817 A1 | 5/2002 | Furue | |
| 2002/0096653 A1 | 7/2002 | Karasawa | |
| 2002/0100887 A1 | 8/2002 | Hagiwara et al. | |
| 2003/0010945 A1 | 1/2003 | Ishikawa | |
| 2003/0047682 A1 * | 3/2003 | Hatakeyama et al. ....... | 250/310 |
| 2003/0169060 A1 * | 9/2003 | Shinada et al. ............ | 324/751 |
| 2004/0066544 A1 * | 4/2004 | Suga et al. ............ | 358/509 |
| 2004/0105132 A1 * | 6/2004 | Sunaga ............ | 358/474 |
| 2005/0218353 A1 * | 10/2005 | Liang ............ | 250/584 |
| 2008/0094631 A1 * | 4/2008 | Jung et al. ............ | 356/419 |

FOREIGN PATENT DOCUMENTS

EP    1 079 613 A2    2/2001
EP    1 143 265 A2    10/2001

* cited by examiner

*Primary Examiner*—Jerome Grant, II

(57) ABSTRACT

A reading apparatus obtains a line of image data stored on a surface, the reading apparatus having a radiation source (12) for directing a line of stimulating radiation onto a stimulable image carrier on the surface, generating a line of image-bearing radiation. A sensing head (22) having a plurality of channels (66) obtains image data from the line of image-bearing radiation, each channel (66) sensing a segment (32) of the line of image-bearing radiation. Each channel (66) has inverting optics for inverting the segment (32) of the line of image-bearing radiation to form an inverted line segment image (44) and a sensor (29) for providing image data for the inverted line segment image (44). An image processor (30) accepts image data from sensing head channels (66) and forms a line of image data according to the line of image-bearing radiation.

37 Claims, 12 Drawing Sheets

RADIATION IMAGE SCANNING APPARATUS AND METHOD

FIELD OF THE INVENTION

The present invention generally relates to imaging systems for reading images exposed on CR plates and more particularly relates to an imaging system for scanning line images using single-stage inverting imaging optics.

BACKGROUND OF THE INVENTION

Computed radiography (CR) systems using stimulable phosphor sheets enjoy broad acceptance as clinical imaging tools. In a CR system, radiation is passed through a subject and impinges upon a stimulable phosphor sheet, commonly referred to as a CR plate, that stores a portion of the radiation energy as a latent image. After exposure to the radiation, the stimulable phosphor on the CR plate is subsequently scanned using an excitation light, such as a visible light or laser beam, in order to emit the stored image.

Early CR scanning systems employ a flying-spot scanning mechanism, in which a single laser beam is scanned across the phosphor plate in a raster pattern. The resulting excitation that provides the stored image is then directed to a sensor, providing a single point of image data at a time. More recent CR systems have improved upon this earlier technique by providing a full line of image data at a time, offering advantages of faster throughput and lower cost and complexity over flying-spot scanners. As just one example, U.S. Pat. No. 6,373,074 (Mueller et al.) discloses a CR system that scans a full line of image data points at a time.

FIG. 1 shows the basic components of an optical scanning system 10 such as that described in U.S. Pat. No. 6,373,074. A linear array of light sources 12, typically an array of laser diodes, directs a linear scanning beam 14 onto a stimulable phosphor sheet 16 that has been irradiated and stores a latent X-ray image. One or more cylindrical lenses 18 are used to direct the highly asymmetric linear output beam along a line 20 on the surface of phosphor sheet 16. In a sensing head 22, collection optics 24 direct the stimulated light from line 20 on phosphor sheet 16 through an optical filter 26 and to a linear photodetector array 28, typically a charge couple device (CCD) array. Phosphor sheet 16 is indexed in direction D by a transport mechanism 60, such as a continuous belt or other indexing apparatus, to provide a scanning motion. In this way, phosphor sheet 16 is scanned past sensing head 22 to detect each line of the image stored thereon. The sensed image data is then processed by an image processor 30 that assembles a two-dimensional output image from each successive sensed line. The output image can then be recorded onto a writable medium such as a photosensitive film, or can be displayed.

There have been a number of solutions proposed for improving the overall performance of CR plate scanner optics, including the following:

U.S. Patent Application Publication No. 2003/0010945 (Ishikawa) discloses improvements to light projection apparatus for projecting a line of stimulating light from an array of laser diodes;

U.S. Patent Application Publication No. 2002/0096653 (Karasawa) discloses the use of condenser lens chromatic characteristics for isolating stimulated light from stimulating light provided from the array of laser diodes;

U.S. Patent Application Publication No. 2002/0056817 (Furue) discloses a more compact reading apparatus for obtaining the stored image from an irradiated stimulable phosphor sheet;

U.S. Patent Application Publication No. 2002/0040972 (Arakawa) discloses an optical reading head that employs a grid pattern for sensing each line of the stored image;

U.S. Patent Application Publication No. 2002/0100887 (Hagiwara et al.) discloses an improved photodiode arrangement in a scanning head for a stimulable phosphor sheet; and U.S. Patent Application Publication No. 2001/0028047 (Isoda) discloses a system using conventional optical techniques with improvements to line sensor componentry for obtaining a larger percentage of the stimulated light.

While there have been numerous improvements to apparatus and methods for obtaining the stored image on a CR plate, there is still need for increased efficiency and overall image quality. One widely recognized problem with existing CR plate readers relates to the need for improved image quality at image sensing circuitry (generally represented as linear photodetector array 28 in FIG. 1). The apparatus disclosed in U.S. Patent Application Publication Nos. 2002/0096653, 2001/0028047, 2002/0040972, and in U.S. Pat. No. 6,373,074, and elsewhere, for example, employ Selfoc™ lenses and provide 1:1 imaging. While this solution allows compact packaging of the sensing components and their support optics, it imposes a constraint on numerical aperture (NA). The Selfoc™ gradient index lens is characterized as having a low NA. The maximum f/# value for this type of lens is typically about f/2, which provides an NA of 0.25. Because collection efficiency of this lens is proportional to the square of the NA value, a low NA can significantly degrade overall system brightness. Yet another disadvantage of existing systems relates to the relatively low fill factor of the Selfoc lens array. Gaps between adjacent Selfoc™ lens elements limit the fill factor and further constrain light collection.

As a result of the overall inefficiency of the collection optics, the signal-to-noise (SN) ratio of conventional sensing systems is disappointing. Collecting light over a broader area, such as is disclosed in U.S. Patent Application Publication No. 2001/0028047 noted above, tends to further degrade the SN relationship, even when using two-channel sensing optics. Low collection efficiency also constrains the reading speed of the CR plate reader. In addition, these systems use 1:1 imaging, which may require two optical stages if an optical system other than a Selfoc™ lens is used, with correction for imaging aberration for each stage.

Thus it can be seen that while prior art solutions provide a CR plate reader with some capability, the need for improved light collection efficiency must be met for further improvements in reader sensitivity and overall performance.

SUMMARY OF THE INVENTION

With the above object in mind, the apparatus and methods of the present invention offer solutions for improving light collection efficiency of CR reading apparatus. The present invention provides a reading apparatus for obtaining a line of image data stored on a surface, the reading apparatus comprising:

(a) a radiation source for directing a line of stimulating radiation onto a stimulable image carrier on the surface, generating a line of image-bearing radiation thereby;

(b) a sensing head for obtaining image data from the line of image-bearing radiation excited from the image carrier, the sensing head having a plurality of channels, each channel sensing a segment of the line of image-bearing radiation, each channel comprising:

(i) inverting optics for inverting the segment of the line of image-bearing radiation to form an inverted line segment image; and (ii) a sensor for providing image data for the inverted line segment image;

(c) an image processor for accepting the image data obtained from sensing head channels and forming a line of image data according to the line of image-bearing radiation.

It is a distinguishing feature of the apparatus of the present invention that it uses, for obtaining each of a set of inverted images, a single optical stage that provides inverted imaging at a range of magnification factors.

It is an advantage of the present invention that it provides a reading apparatus for a CR plate that offers improved speed and overall collection efficiency, as well as improved signal-to-noise (SN) ratio.

It is an advantage of the present invention that, due to the reduced number of optical stages, it allows simpler optical design for correcting image aberration.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 13b is a graph showing the spatial relationship of sensed channels using the dual sensing head with the offset as shown in FIG. 13a; and FIG. 13c is a graph showing the additive effect of sensed channels obtained with the dual sensing head arrangement represented in FIGS. 12 and 13a.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The description that follows employs the +/− polarity for magnification that is conventionally used among those skilled in the optical arts. That is, positive (+) magnification refers to a non-inverted image; negative (−) magnification refers to an inverted image. (For example, with a 1:−1.2 magnification ratio, the image is inverted and is magnified times 1.2.)

Use of Optical Stages for Imaging Line Segments

Figure 1:
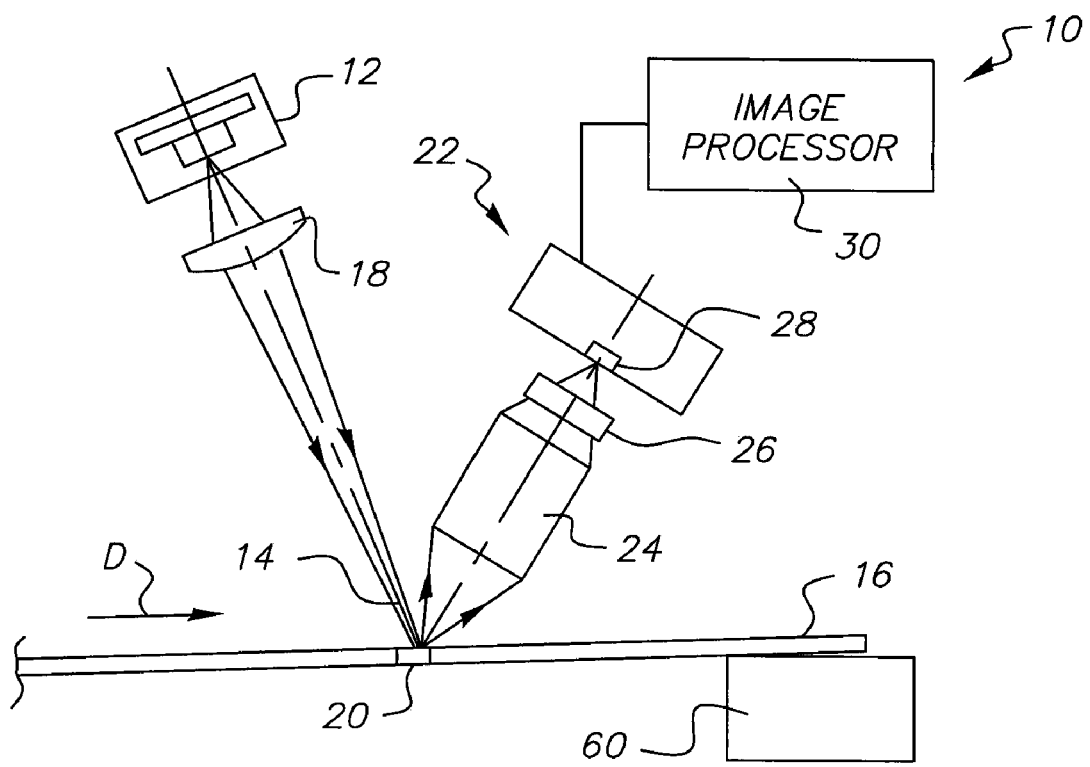
FIG. 1 is a schematic block diagram showing the basic component arrangement of a prior art CR plate reader.
Figure 2A:
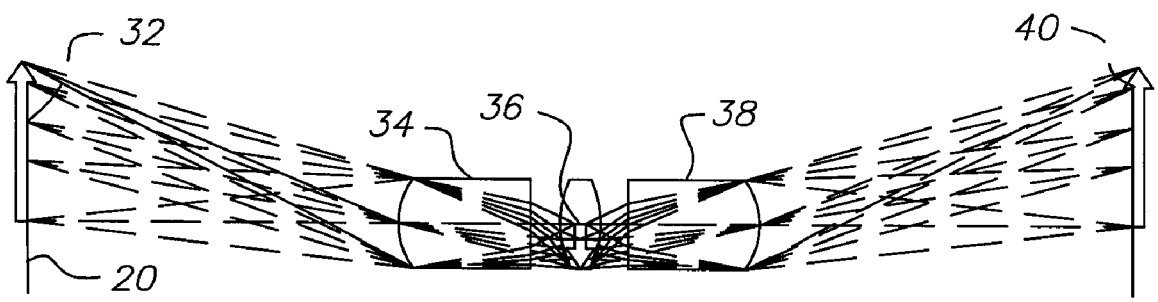
FIGS. 2a, 2b, and 2c are ray diagrams comparing 1:1, Selfoc™ lens, and 1:−1 imaging, respectively.
Figure 2B:
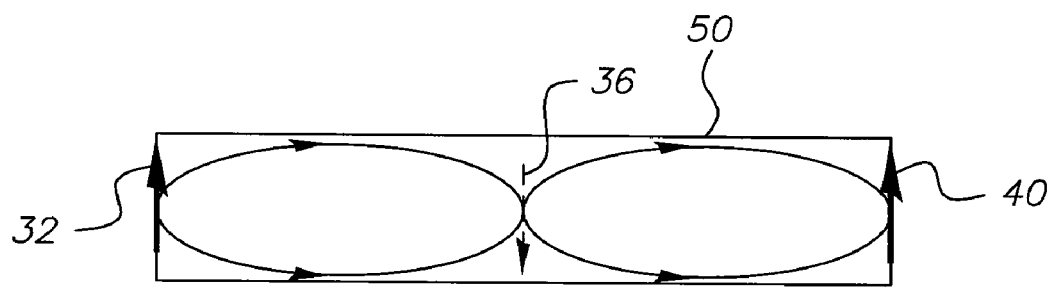
Figure 2C:
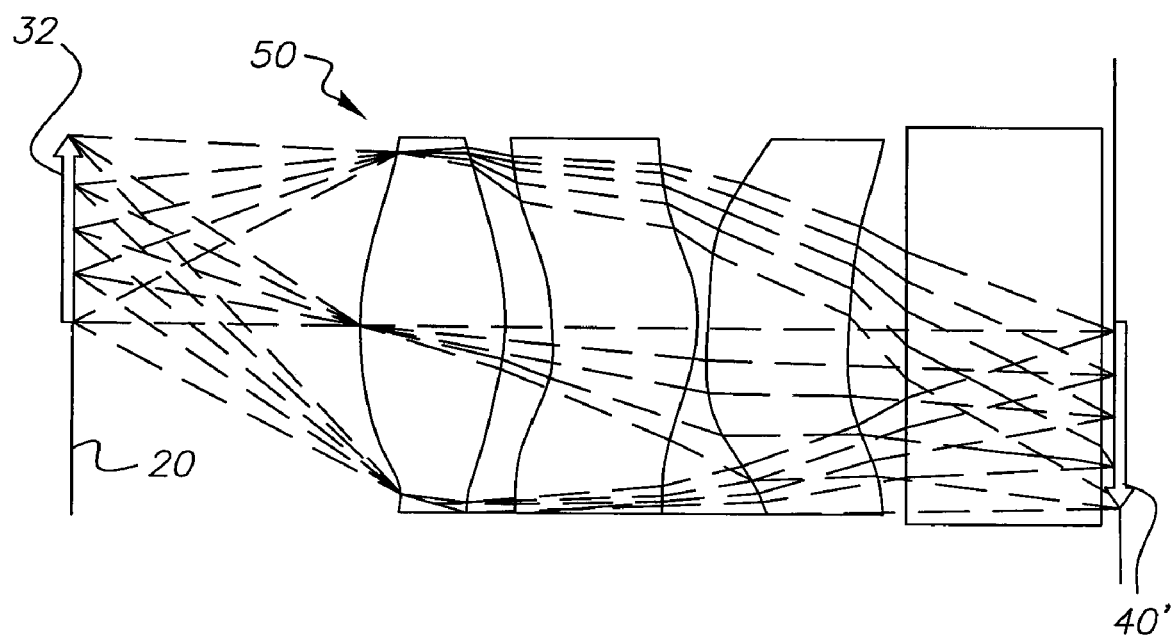

In order to appreciate the operation of imaging optics in the apparatus and method of the present invention, it is first useful to contrast the 1:1 imaging technique used in prior art CR reading apparatus with the nominal 1:−1 imaging technique that has been adapted to the present invention. Referring first to FIG. 2a, there is shown the conventional imaging technique used in CR reading apparatus of FIG. 1 for scanning each segment of line 20. Radiation from each object segment 32 of line 20 is inverted through a first optical stage 34 to form an intermediate inverted image segment 36. A second optical stage 38 again inverts inverted image segment 36 to form a non-inverted image segment 40. Each optical stage 34 and 38 is typically an arrangement of multiple lenses, but represented for simplicity as a single unit in FIG. 2a. For comparison, FIG. 2b is the imaging diagram of lens assembly 50 for a Selfoc™ lens. The intermediate image plane (in which intermediate inverted image segment 36 is formed) is inside the lens. The Selfoc™ lens of FIG. 2b provides non-inverted image segment 40, as shown. In comparison with both two-stage and Selfoc™ optical configurations of FIGS. 2a and 2b respectively, FIG. 2c shows a single optical stage as lens assembly 50, directing radiation from object segment 32 to form an inverted image segment 40'.

It must be observed that each optical stage 34 and 38 in the conventional arrangement of FIG. 2a introduces an amount of image aberration. Thus, even though the arrangement of FIG. 2a provides non-inverted image segment 40, this arrangement inherently requires increased correction for image aberration with conventional optical design over the single optical stage arrangement of lens 50 in FIG. 2b.

Considerations for Magnification

Figure 3A:
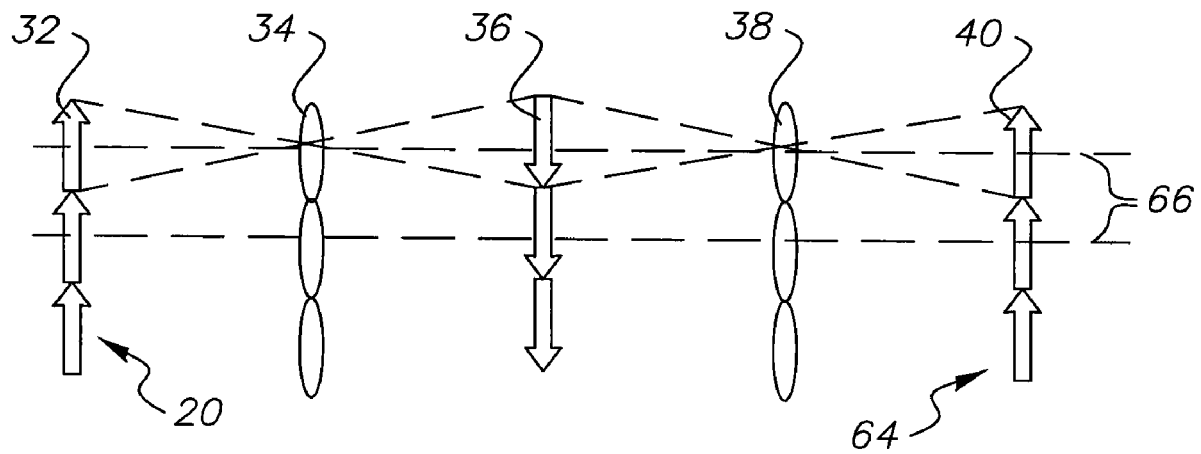
FIGS. 3a and 3b are block diagrams showing optical arrangements for imaging segments of a scanned line, using 1:1 and nominal 1:−1 imaging.

FIG. 3a shows how an image line 64 is formed in 1:1 imaging by an array, using the two-stage arrangement of FIG. 2a. Here, image line 64 is formed as a series of congruent, non-inverted image segments 40 of their corresponding congruent object segments 32. A channel 66, represented in dotted lines, forms the image, non-inverted image segment 40, for each individual object segment 32, using an arrangement of optical components. Using multiple optical stages 34 in an array of channels 66, this method first forms an intermediate image consisting of inverted image segments 36. A second arrangement of optical stages 38 in a second array then forms the reconstructed image line 64. Non-inverted image segments 40 have substantially the same dimensions as their corresponding object segments 32.

Figure 3B:
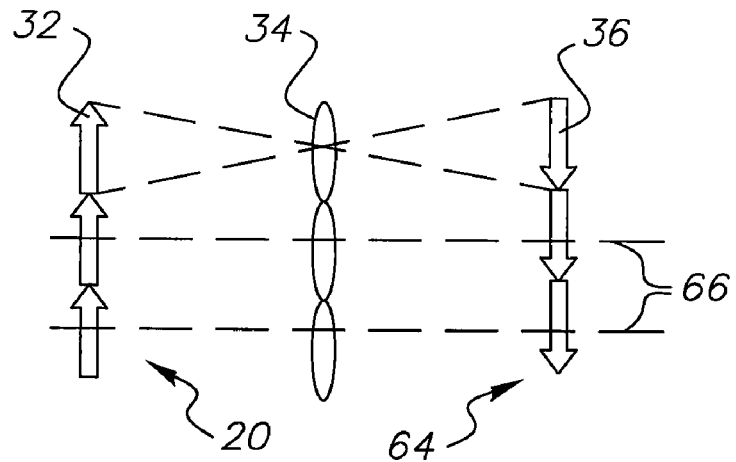

FIG. 3b, on the other hand, shows how image line 64 is initially formed along each channel 66 using 1:−1 imaging and one optical stage 34. It might appear that image line 64 would simply be an inverted version of line 20; however, each individual image segment 36 is inverted, as is represented in FIG. 3b. Moreover, line 20 itself has some width dimension. This means that inverted image segments 36 are also "mirrored" with respect to object segments 32. Thus, further processing is needed to assemble image line 64 properly, as is described subsequently.

Figure 3C:
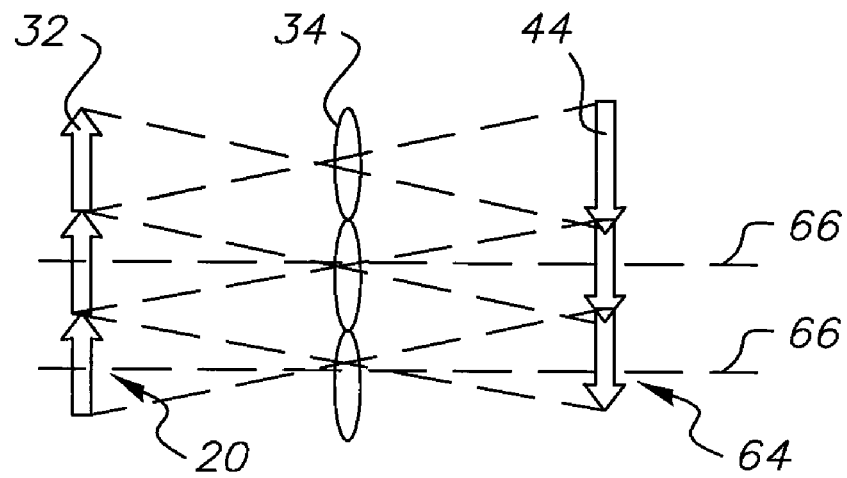
FIG. 3c is a block diagram showing an optical arrangement for imaging segments of a scanned line using a nominal 1:−1.2 imaging.
Figure 3D:
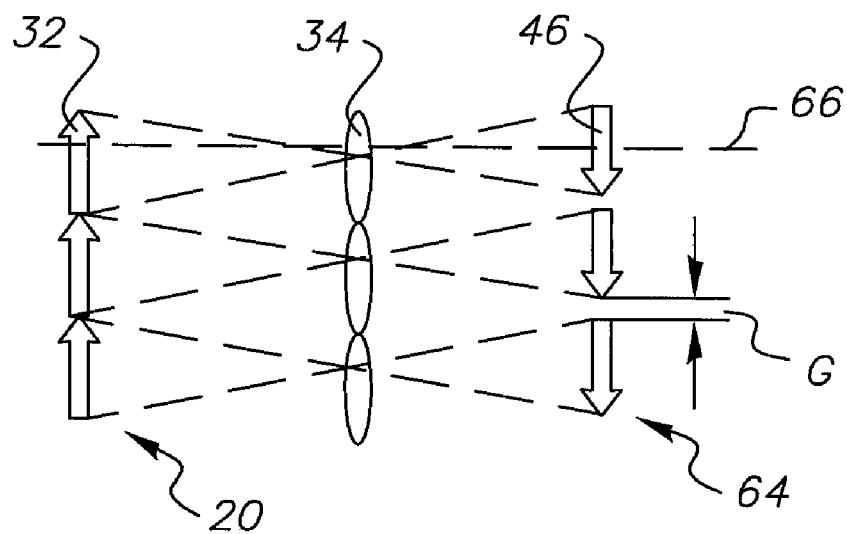
FIG. 3d is a block diagram showing an optical arrangement for imaging segments of a scanned line using a nominal 1:−0.95 imaging.

While FIG. 3b shows 1:−1 imaging for object segments 32, other magnification factors are possible for the inverted image segments in each channel 66. Referring now to FIG. 3c, there is shown an arrangement where magnification provides a nominal 1:−1.16 imaging. Here, inversion and magnification at a value greater than 1 are effected. Inverted image segments 44 are magnified and overlap each other slightly. FIG. 3d, meanwhile, shows magnification providing a nominal 1:−0.95 imaging scheme, in which inversion and magnification at a value less than 1 is effected. Here, inverted image segments 46 are reduced in size and a gap G occurs between each image segment 46.

Using conventional imaging approaches, the imaging method of FIG. 3d would seem to be disadvantageous over nominal 1:1 or 1:−1 imaging as shown in FIGS. 3a and 3b, respectively. However, there are unexpected advantages in separating inverted image segments 46, as represented in FIG. 3d. By providing gap G between each inverted image segment 46, the method used in FIG. 3d enables each inverted image segment 46 to be readily handled as a separate unit by optical sensing and processing components in each channel 66. That is, gap G clearly defines, for imaging logic, the end-points of each inverted image segment 46. Thus, each inverted image segment 46 can be sensed individually, with minimal crosstalk from congruent image segments 46 in adjacent channels 66, and can then be processed and inverted using imaging algorithms for assembling image line 64.

Arrangement of a Single Channel 66

Figure 4:
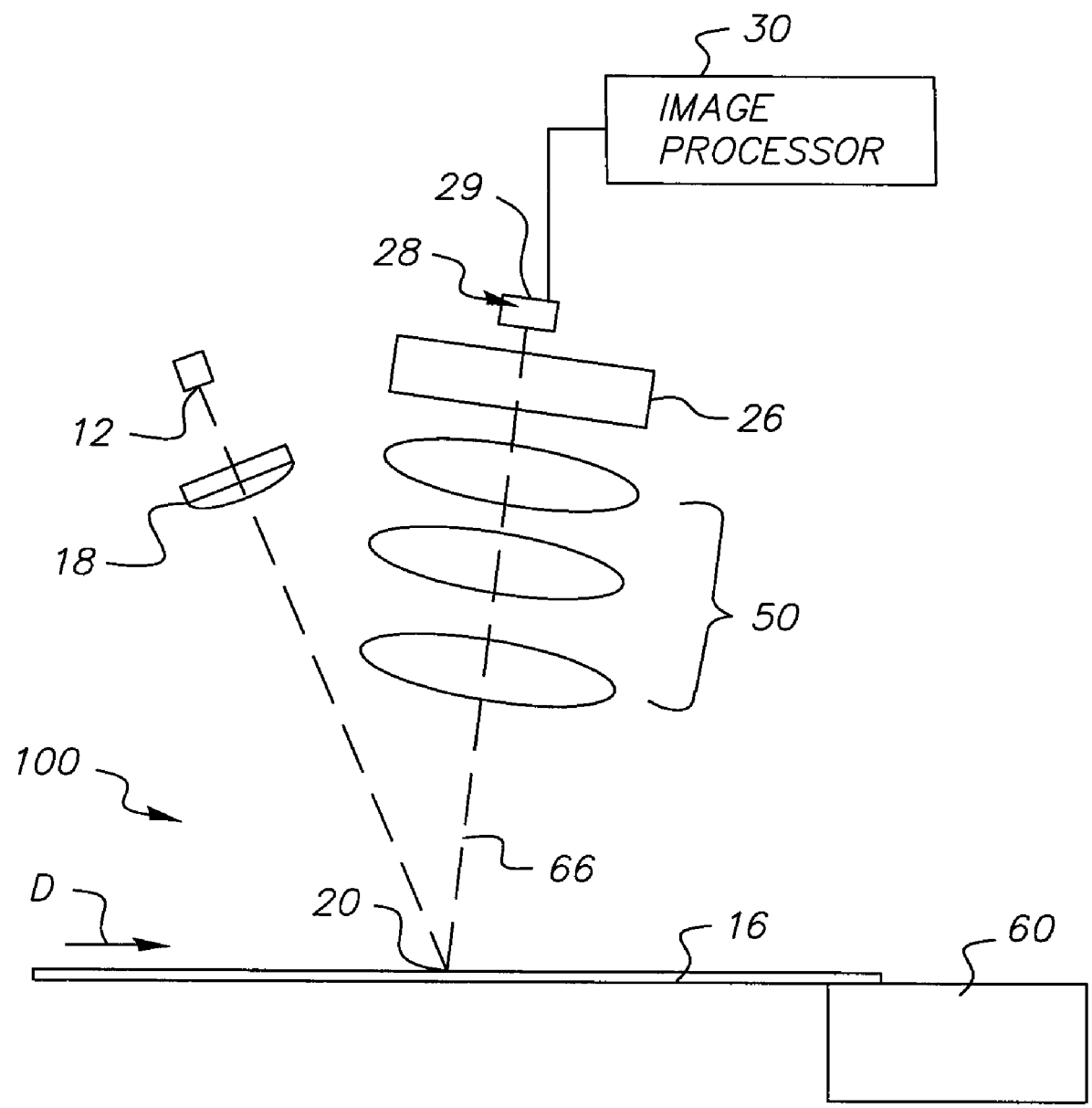
FIG. 4 is a schematic side view showing the basic component arrangement of a single channel of a CR plate reader in a single sensing head embodiment, according to the present invention.

Referring to FIG. 4, there is shown an optical scanning system 100 according to the present invention, with sensing components for a single channel 66. Radiation from light source 12 is directed onto phosphor sheet 16 through lens 18. Image-bearing line 20 emitted from the surface of phosphor sheet 16 is then scanned as individual congruent object segments 32, as was described with reference to FIG. 3d. Radiation from each object segment 32 is directed through optical filter 26 by lens assembly 50 and onto a photosensor 29 in photodetector array 28.

Image processor 30 then processes the obtained image data for each inverted image segment 36 for 1:−1 imaging (FIG. 3b), inverted image segment 44 for inversion and magnification (FIG. 3c), or inverted image segment 46 for inversion and demagnification (FIG. 3d). Image processor 30 then reconstructs image line 64 from individual image segments 36, 44, or 46. As with prior art devices, described with reference to FIG. 1, transport mechanism 60 is used to index phosphor sheet 16, one line 20 at a time, in direction D for scanning.

Figure 5:
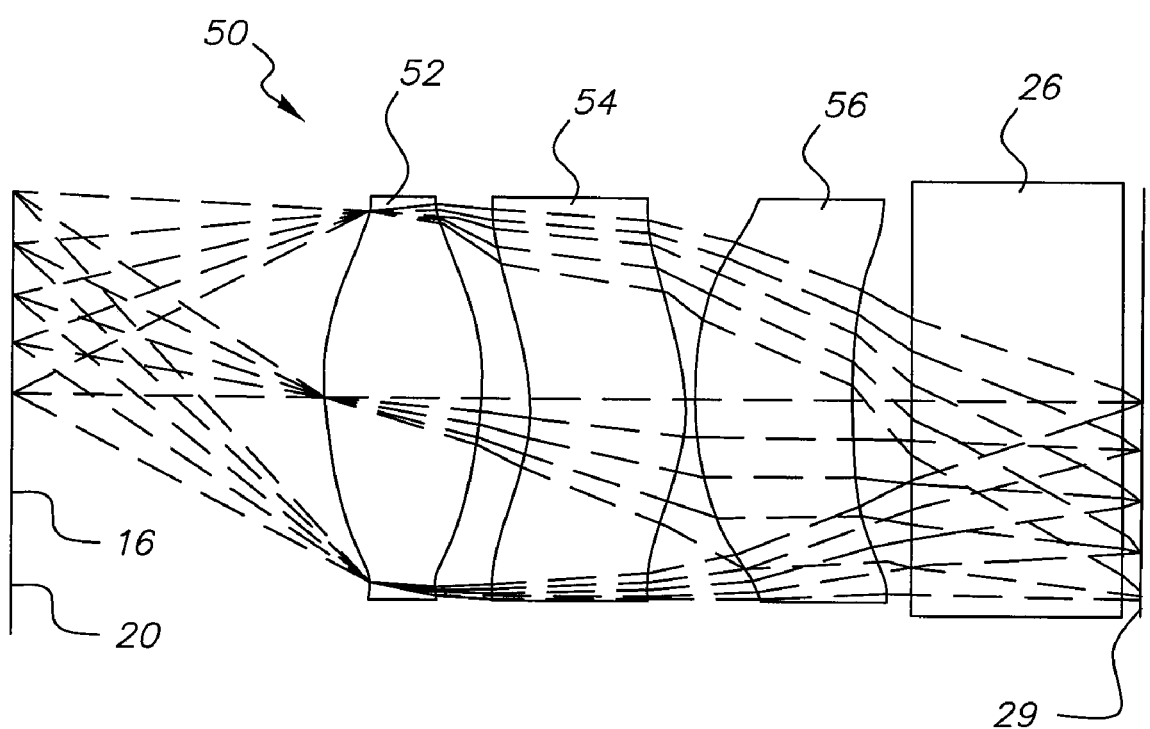
FIG. 5 is a ray diagram showing a lens assembly for a single channel according to the present invention.

Referring to FIG. 5, components of lens assembly 50 for each object segment 32, that is, for each channel 66, are shown. Lenses 52, 54, and 56 provide image inversion and magnification/demagnification of radiation from line 20 on phosphor sheet 16 and form an image onto photosensor 29.

Array Arranyement of Channels 66

Figure 6:
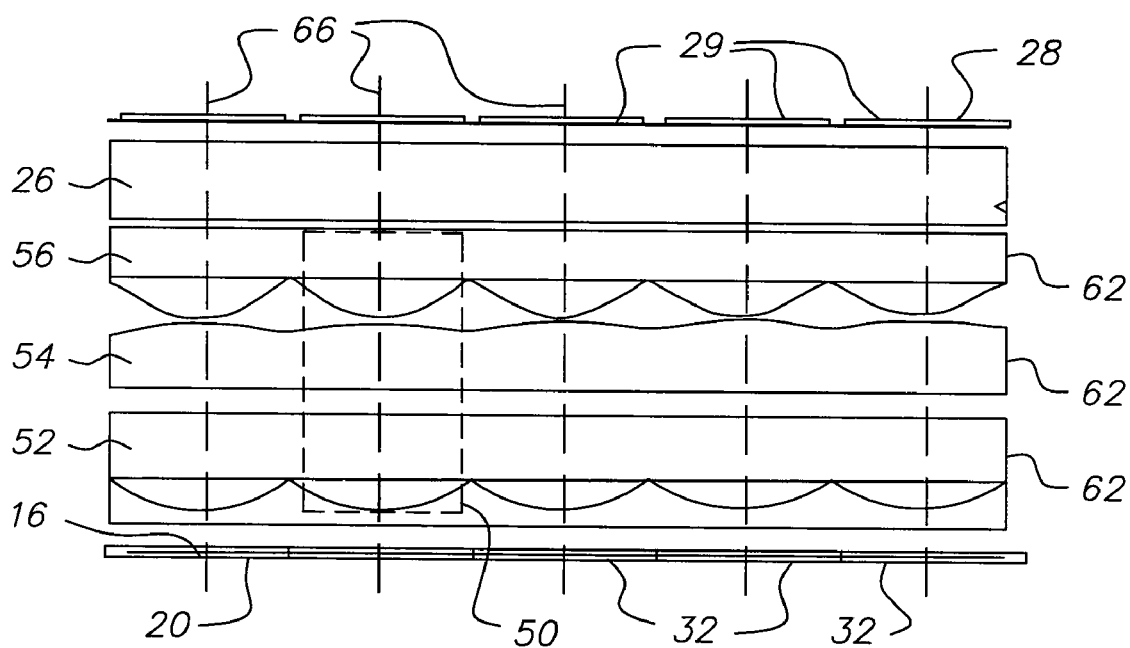
FIG. 6 is a cross-sectional diagram showing one arrangement for a portion of an array of lens assemblies.
Figure 7:
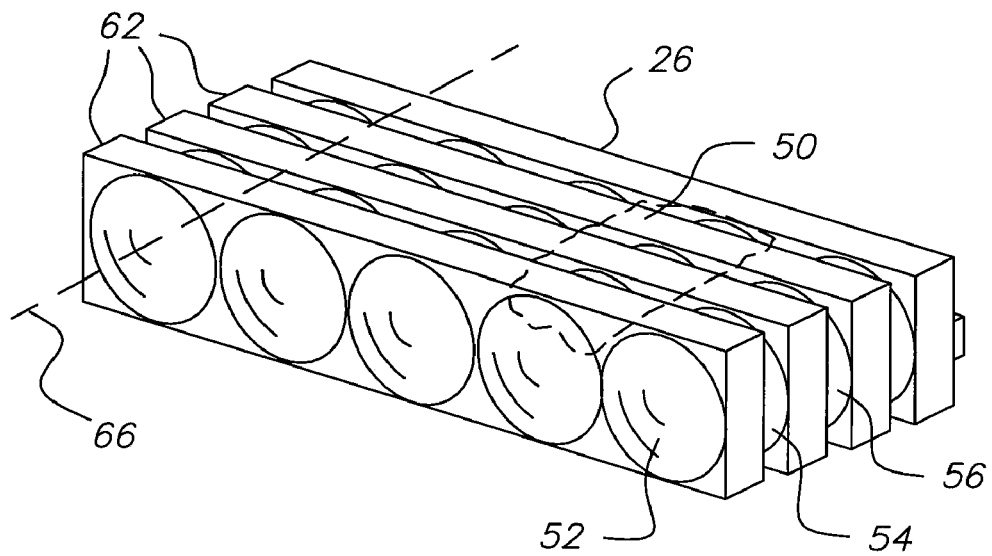
FIG. 7 is a perspective view of a portion of an array of lens assemblies.

For scanning line 20 according to the present invention, a lens array 62 provides light-handling components for each of the individual channels 66, as shown in the cross-section of FIG. 6. Each object segment 32 of line 20 has a corresponding channel 66 with its lens assembly 50, shown outlined for a single channel 66. Photodetector array 28 itself consists of an array of individual photosensors 29, one for each channel 66. FIG. 7 shows the arrangement of channel 66 optical components in a perspective view. Lenses 52, 54, and 56 are provided in lens arrays 62, with the individual optical elements suitably aligned to provide the needed components for each channel 66.

Figure 8:
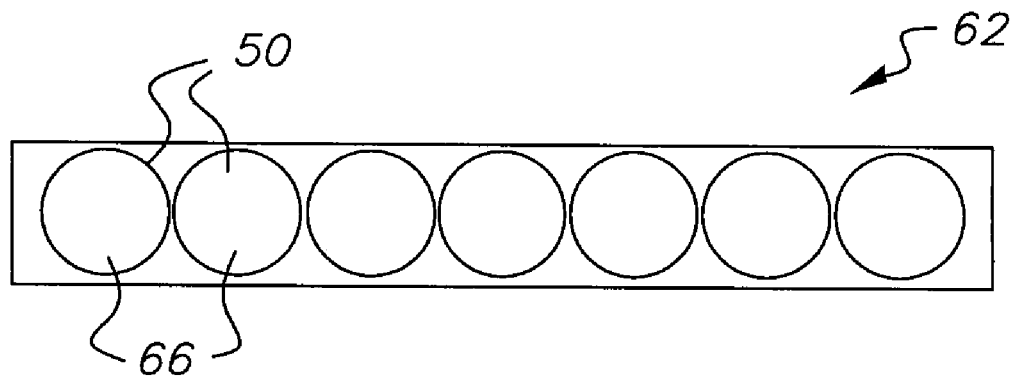
FIG. 8 is a front view showing an array of lens assemblies arranged in a linear fashion.

Channels 66 in lens arrays 62 may be arranged in a line, as shown in the front view of FIG. 8. This embodiment is constrained, however, to magnification factors less than or equal to 1, primarily to minimize optical crosstalk between adjacent object segments 32. Alternately, to provide improved fill factor and magnification factors in excess of 1, adjacent channels 66 may be spatially shifted, as shown in the front view of FIG. 9. In the FIG. 9 embodiment, adjacent channels 66 are shifted, in the width direction relative to line 20, by a distance Y, yielding an improved fill factor and allowing magnification factors exceeding 1. This effectively increases light collection efficiency and provides other advantages for image processing, as described subsequently.

Configuration and Operation of Sensing Head 22

Figure 10A:
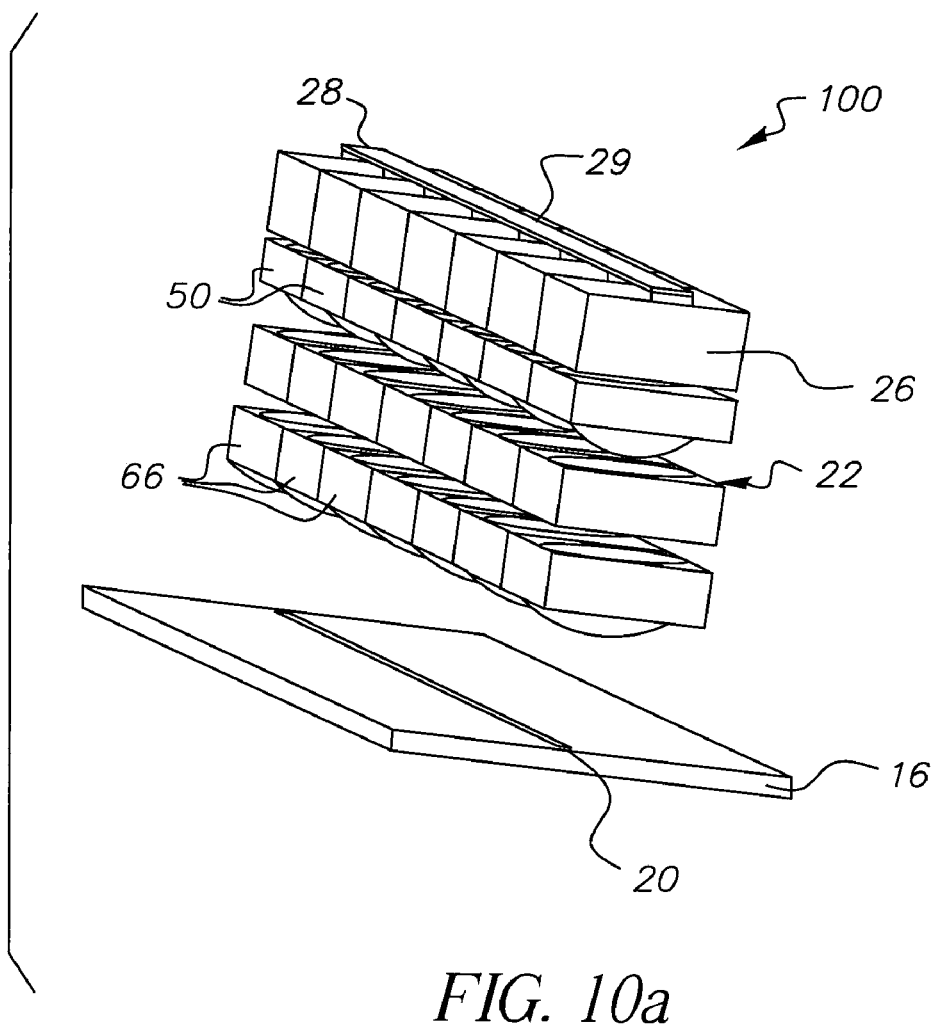
FIG. 10a is a perspective view showing a portion of a CR sensing head, using a linear array of lens assemblies arranged as shown in the embodiment shown in FIG. 8.
Figure 10B:
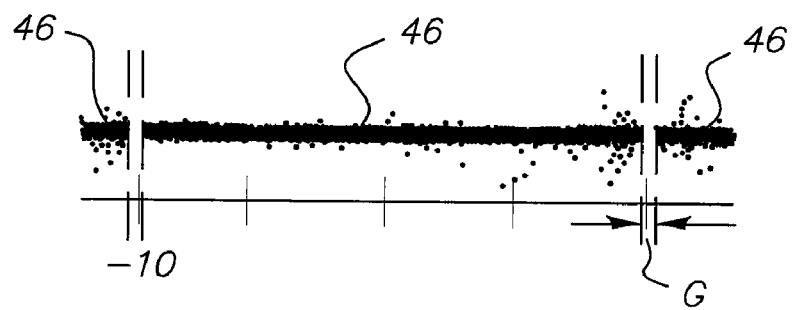
FIG. 10b is a diagram showing a scanned line segment obtained using the linear array of FIGS. 10a and FIG. 8.

Referring to FIG. 10a, there is shown a portion of sensing head 22 in optical scanning system 100 using an embodiment with channels 66 having the straight-line arrangement of FIG. 8. The graph of FIG. 10b shows how the optical arrangement of FIGS. 8 and 10a provides individual inverted line segments 46, demagnified and slightly separated by gap G. With the more conventional arrangement of FIG. 10a, the width and field of each lens assembly 50 is constrained by the space available, as is noted above.

Figure 9:
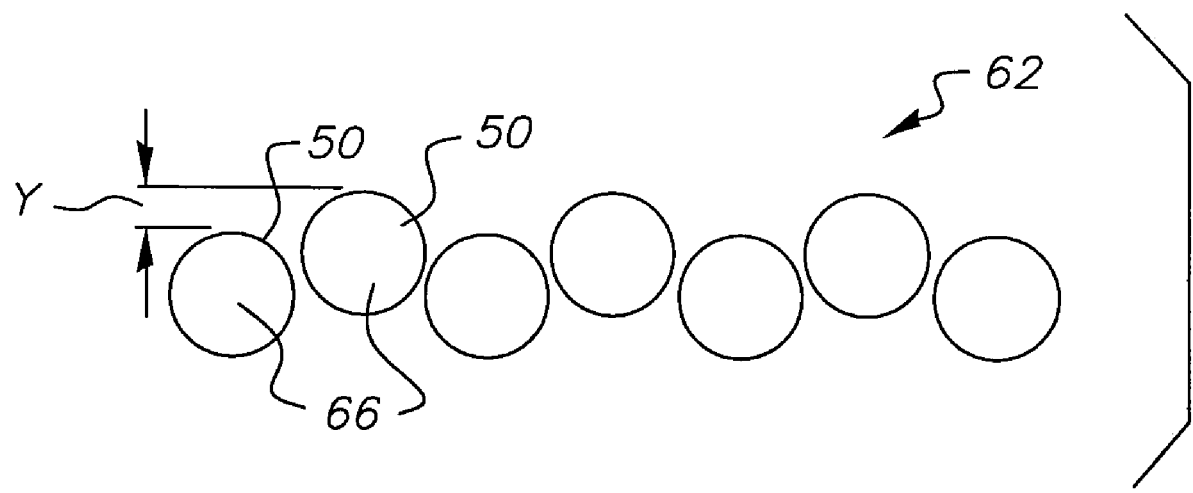
FIG. 9 is a front view showing an alternate arrangement from that shown in FIG. 8, in which lens assemblies are arranged in a staggered linear array.
Figure 11A:
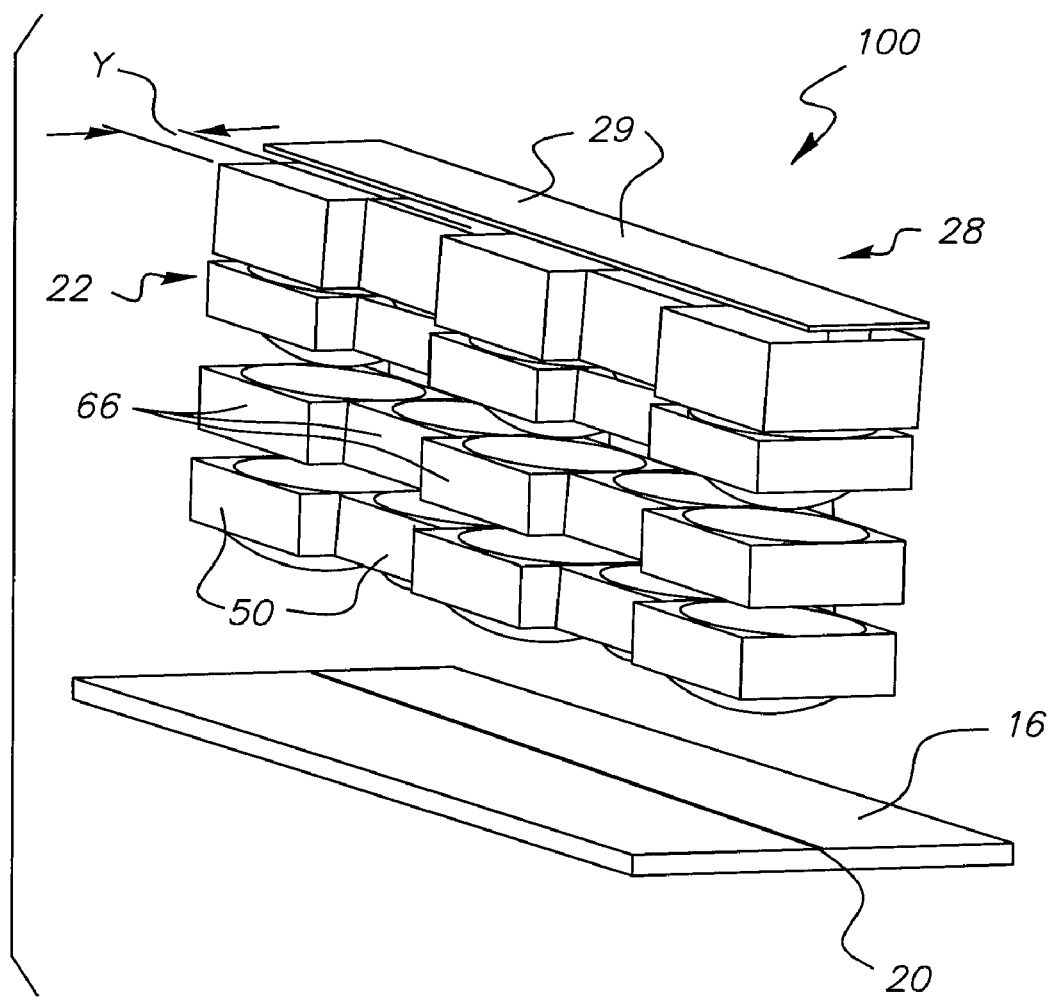
FIG. 11a is a perspective view showing a staggered linear array of lens assemblies in the embodiment shown in FIG. 9.
Figure 11B:
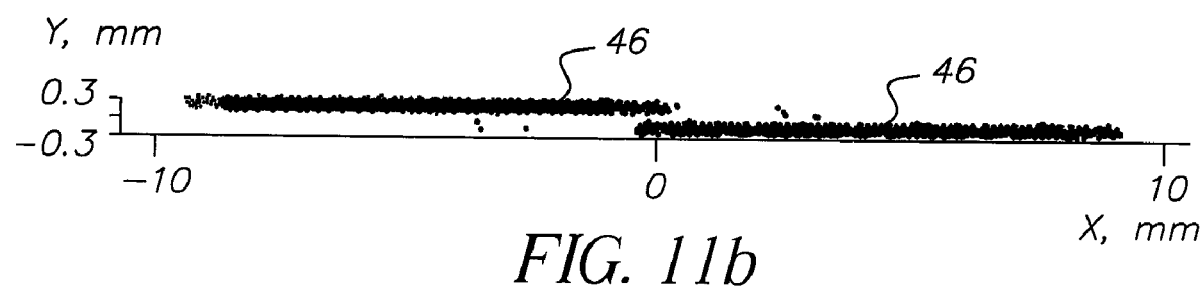
FIG. 11b is a diagram showing a scanned line segment obtained using the staggered linear array of FIGS. 11a and FIG. 9.

Referring to FIG. 11a, an alternate embodiment of a portion of sensing head 22 with channels 66 having the shifted arrangement of FIG. 9 is shown. The graph of FIG. 11b shows how this arrangement provides, to photodetector array 28 of photosensors 29, individual inverted line segments 46 having a slight spatial overlap. This embodiment allows each channel 66 to provide inversion and magnification with a factor greater than 1, providing 1:−1.18 magnification for example. This arrangement can be used to help compensate for inherent fall-off of the image of each object segment 32 at the edges, as is well known to those skilled in the optical arts.

Embodiment Using Dual Sensing Heads 22

Figure 12:
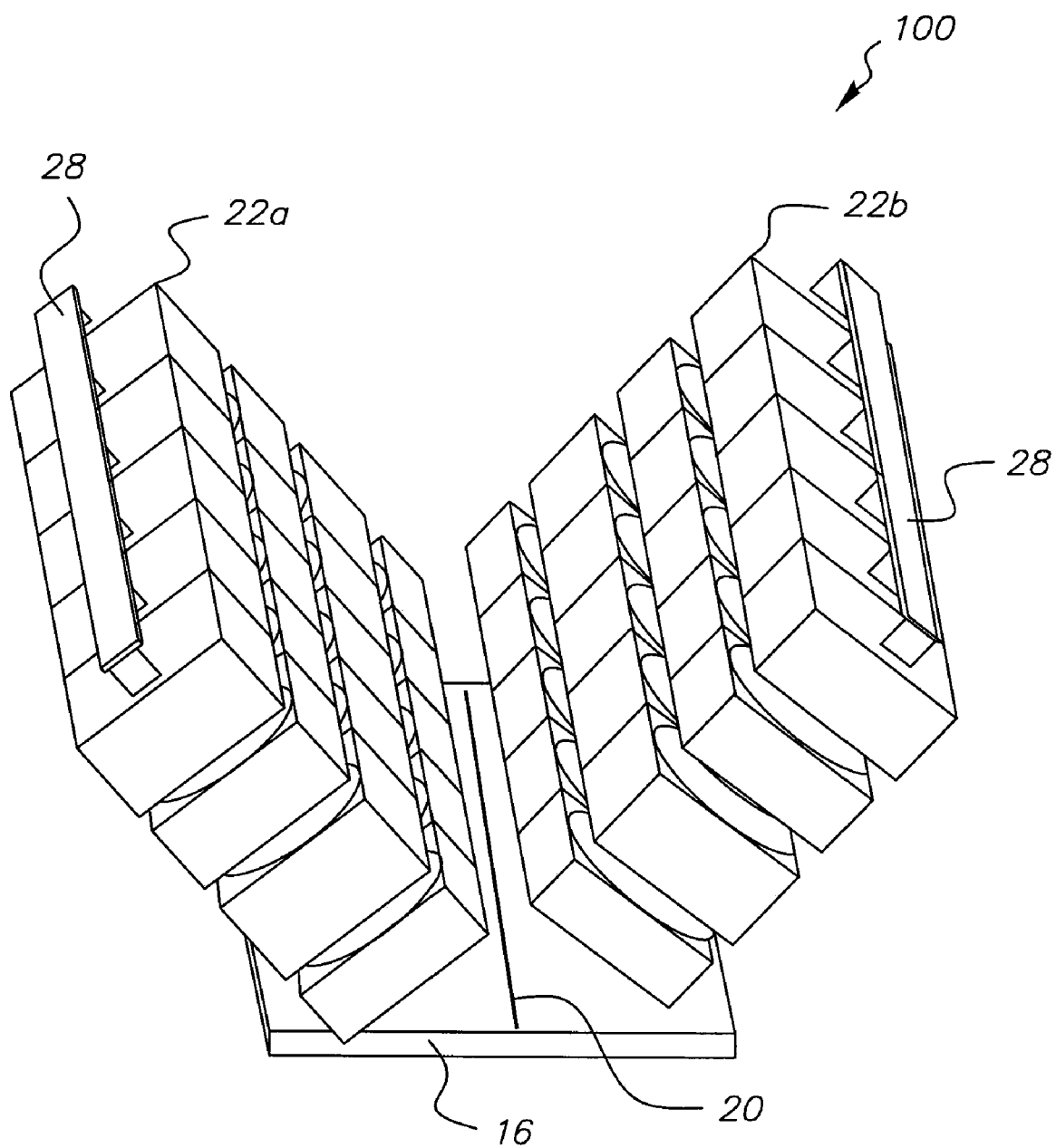
FIG. 12 is a perspective view showing a dual sensing head used in an alternate embodiment.

FIG. 12 shows an alternate embodiment in which optical scanning system 100 has dual sensing heads 22a and 22b. One advantage of this embodiment is best represented using the cross-sectional view of FIG. 13a. Here, channels 66 in the respective lens arrays 62 of sensing heads 22a and 22b are offset with respect to the length of line 20, allowing higher scan speed with improved SN ratio. As FIG. 13a illustrates, adjacent channels 66 are nominally offset by one-half of the channel width W, increasing collection efficiency over that of the single sensing head 22 of the FIG. 10a embodiment.

Figure 13A:
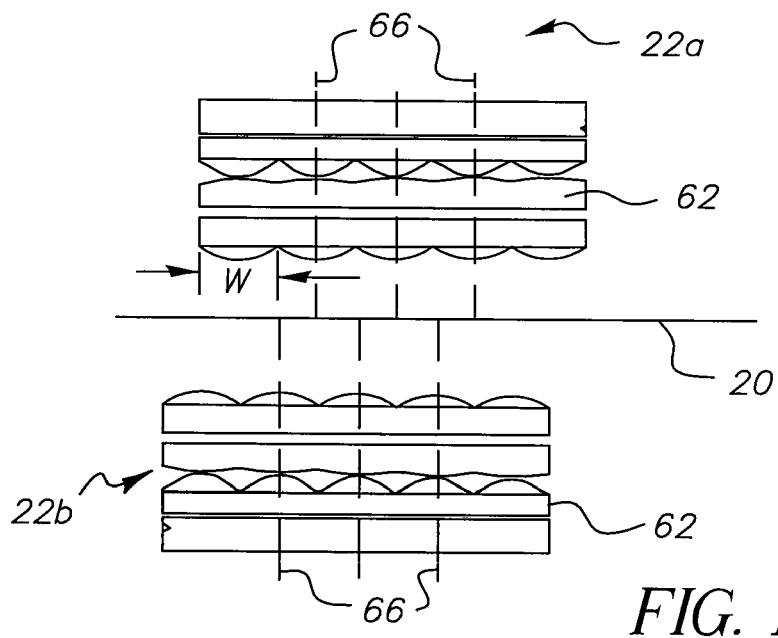
FIG. 13a is a cross-sectional diagram showing one arrangement for a dual sensing head, in which channels on each head are offset from each other with respect to the scanned line.
Figure 13B:
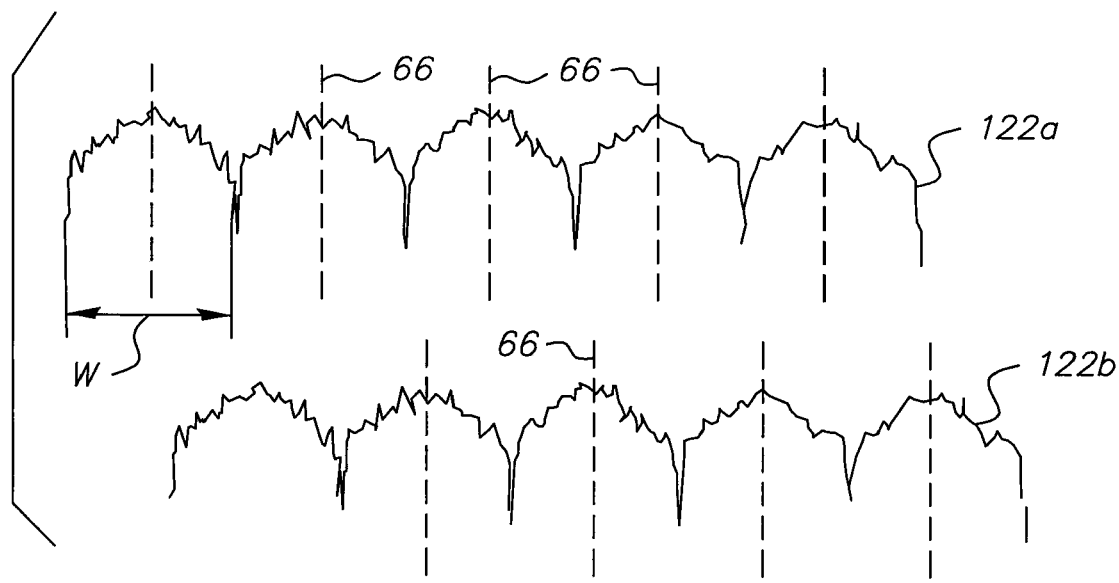
Figure 13C:

The graphical representations of FIGS. 13b and 13c show how the offset arrangement of dual sensing heads 22a and 22b in FIG. 13a improves the collection efficiency. One waveform 122a is obtained from sensing head 22a; another waveform 122b is obtained from sensing head 22b. Waveforms 122a and 122b, graphing the spatial distribution of light energy for each of five channels 66 at respective sensing heads 22a and 22b, shows how $\cos^4$ effects degrade the optical signal near the edges of each channel 66. FIG. 13c shows a combined waveform 124 that is the result of summing or otherwise combining the sensed light energy of waveforms 122a and 122b, providing a relatively uniform collection efficiency along the length of sensed line 20.

In addition to obtaining improved uniformity, the dual sensing head 22a and 22b arrangement of FIG. 12 also provides improved collection efficiency of optical scanning system 100 over that of the single sensing head 22 shown in FIG. 10a. Nominal collection efficiency of the FIG. 10a embodiment is approximately 18%, whereas the improved collection efficiency of the FIG. 12 embodiment is approximately 30%. This level of improvement is significant, allowing the residual image scanned from line 20 to be more accurately obtained, lowering the overall signal-to-noise ratio of optical scanning system 100. The arrangement of channels 66 within each sensing head 22a or 22b of FIG. 12 can be linear, as is shown in FIGS. 8 and 10a or shifted, as is shown in FIGS. 9 and 11a.

In any of the embodiments of optical components shown in FIGS. 4, 10a, 11a, and 12, the role of image processor 30 is to reconstruct each line 20 as it is scanned. With each of these embodiments, each object segment 32 is inverted as it is detected by photosensor 29 and may be at any of a range of magnifications, as is described for the various embodiments given above. As was noted with reference to FIGS. 3b-3d, each inverted image segment 36, 44, or 46 is also mirrored with respect to depth and requires processing to reconstruct image line 64 using the original line 20 data.

Unlike prior art arrangements, the optical embodiments of the present invention shown in FIGS. 4, 10a, 11a, and 12, use a single optical stage to provide inverted image segments 46. This has the inherent advantage of reduced image aberration over conventional designs using two optical stages, as was described with reference to FIGS. 3a-3d. Additional image processing is required for reconstructing the image of line 20 from inverted line segments, but this slight disadvantage is more than compensated by an improvement in overall image quality, due to an improved SN ratio. Unlike prior art arrangements that are constrained to 1:1 imaging, the embodiments of the present invention allow magnification at other factors, depending on what is most advantageous for image quality. Each of the embodiments of FIGS. 4, 10a, 11a, and 12 provide a larger NA than conventional designs, with values at nearly 0.45 or better, with consequent improved collection efficiency and improved signal-to-noise ratio The dual sensing head 22 arrangement described with reference to FIGS. 12 and 13a-13c, when used in conjunction with the inverted segment imaging techniques of the present invention, offers additional advantages in both resolution and collection efficiency over prior art designs.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, with the dual sensing head 22a, 22b configuration of FIG. 12, an offset that is any fraction of channel width W could be employed. Lenslet arrays of various types could be used for fabrication of lens array 62, as is familiar to those skilled in the optical arts. Photosensors 29 could be CCD devices, such as devices using time-delayed integration (TDI), familiar to those skilled in the optical arts. Photosensors 29 could alternately be CMOS devices, or other suitable sensor types. Any type of suitable transport mechanism 60 could be employed for indexing phosphor sheet 16 forward to effect line-by-line scanning.

Thus, what is provided is an apparatus and method for an imaging system for scanning line images using single-stage inverting imaging optics.

PARTS LIST 10 optical scanning system
12 light source
14 scanning beam
16 phosphor sheet
18 lens
20 line
22 sensing head
22a sensing head
22b sensing head
24 collection optics
26 optical filter
28 photodetector array
29 photosensor
30 image processor
32 object segment
34 optical stage
36 inverted image segment
38 optical stage
40 non-inverted image segment
40' inverted image segment
44 inverted image segment
46 inverted image segment
50 lens assembly
52 lens
54 lens
56 lens
60 transport mechanism
62 lens array
64 image line
66 channel
100 optical scanning system
122a waveform
122b waveform
124 combined waveform

The invention claimed is:

1. A reading apparatus for obtaining a line of image data stored on a surface, the reading apparatus comprising:
   (a) a radiation source for directing a line of stimulating radiation onto a stimulable image carrier on the surface, generating a line of image-bearing radiation thereby;
   (b) a sensing head for obtaining image data from the line of image-bearing radiation excited from the image carrier, the sensing head including an array of sensors and having a plurality of channels, each channel sensing a segment of the line of image-bearing radiation, each channel comprising:
      (i) inverting optics for inverting the segment of the line of image-bearing radiation to form an inverted line segment image; and
      (ii) a corresponding sensor from the array of sensors for providing image data for the inverted line segment image; and (c) an image processor for accepting the image data obtained from each of the sensing head channels and forming a line of image data according to the line of image-bearing radiation.

2. A reading apparatus according to claim 1 wherein the radiation source comprises a laser.

3. A reading apparatus according to claim 1 wherein the sensor comprises a charge-coupled device.

4. A reading apparatus according to claim 3 wherein the sensor is a time delayed integration sensor.

5. A reading apparatus according to claim 1 wherein the sensor comprises a CMOS device.

6. A reading apparatus according to claim 1 wherein the inverting optics are arranged in a shifted pattern, such that adjacent channels are spatially shifted with respect to the width of the line of excited radiation.

7. A reading apparatus according to claim 1 wherein the inverting optics provide magnification greater than 1:−1.

8. A reading apparatus according to claim 1 wherein the inverting optics provide magnification less than 1:−1.

9. A reading apparatus according to claim 1 further comprising a transport mechanism for controllably urging the image carrier past the sensing head for obtaining sequential lines of image data.

10. A reading apparatus for obtaining image data stored on a surface, comprising:
 (a) a radiation source for directing a line of stimulating radiation onto a stimulable image carrier on the surface, generating a line of image-bearing radiation thereby;
 (b) a sensing head for obtaining image data from the line of image-bearing radiation excited from the image carrier, the sensing head including an array of sensors and having a plurality of channels, each channel sensing a segment of the line of image-bearing radiation, each channel comprising:
  (i) inverting optics for inverting the segment of the line of image-bearing radiation to form an inverted line segment image; and
  (ii) a corresponding sensor from the array of sensors for providing image data for the inverted line segment image;
 (c) an image processor for accepting the image data obtained from each of the sensing head channels and forming a line of image data according to the line of image-bearing radiation; and
 (d) a transport mechanism for controllably urging the image carrier past the sensing head for obtaining sequential lines of image data.

11. A reading apparatus according to claim 10 wherein the radiation source comprises a laser.

12. A reading apparatus according to claim 10 wherein the sensor comprises a charge-coupled device.

13. A reading apparatus according to claim 12 wherein the sensor is a time delayed integration sensor.

14. A reading apparatus according to claim 10 wherein the sensor comprises a CMOS device.

15. A reading apparatus according to claim 10 wherein the inverting optics are arranged in a shifted pattern, such that adjacent channels are spatially shifted with respect to the width of the line of excited radiation.

16. A reading apparatus according to claim 10 wherein the inverting optics provide magnification greater than 1:−1.

17. A reading apparatus according to claim 10 wherein the inverting optics provide magnification less than 1:−1.

18. A reading apparatus according to claim 10 wherein adjacent segments of the line are substantially contiguous.

19. A reading apparatus according to claim 10 wherein the transport mechanism comprises a continuous belt.

20. A reading apparatus for obtaining a line of image data stored on a surface, comprising:
 (a) a radiation source for directing a line of stimulating radiation onto a stimulable image carrier on the surface, generating a line of image-bearing radiation thereby;
 (b) a first sensing head and a second sensing head for obtaining image data from the line of image-bearing radiation excited from the image carrier, each sensing head including an array of sensors and having a plurality of channels, each channel sensing a segment of the line of image-bearing radiation, and each channel comprising:
  (i) inverting optics for inverting the segment of the line of image-bearing radiation to form an inverted line segment image; and
  (ii) a corresponding sensor from the array of sensors for providing image data for the inverted line segment image; and
 (c) an image processor for accepting the image data obtained from each of the first and second sensing head channels and forming a line of image data according to the line of image-bearing radiation.

21. A reading apparatus according to claim 20 wherein with respect to the length of the line of image-bearing radiation, line segments sensed by channels on the first sensing head are offset from line segments sensed by channels on the second sensing head.

22. A reading apparatus according to claim 20 wherein the segments of the line of image bearing radiation for a channel are substantially contiguous.

23. A reading apparatus according to claim 20 wherein the radiation source comprises a laser.

24. A reading apparatus according to claim 20 wherein the sensor comprises a charge-coupled device.

25. A reading apparatus according to claim 24 wherein the sensor is a time delayed integration sensor.

26. A reading apparatus according to claim 20 wherein the sensor comprises a CMOS device.

27. A reading apparatus according to claim 20 wherein the inverting optics are arranged in a shifted pattern, such that adjacent channels for the first sensing head are spatially shifted with respect to the width of the line of excited radiation.

28. A reading apparatus according to claim 20 wherein the inverting optics for the first sensing head provide magnification greater than 1:−1.

29. A reading apparatus according to claim 20 wherein the inverting optics for the first sensing head provide magnification less than 1:−1.

30. A reading apparatus according to claim 20 further comprising a transport mechanism for controllably urging the image carrier past the first and second sensing heads for obtaining sequential lines of image data.

31. A method for obtaining a line of image data stored on a surface, comprising:
 (a) emitting a line of stimulating radiation onto a stimulable image carrier on the surface, generating a line of image-bearing radiation thereby; and
 (b) generating image data from the line of image-bearing radiation excited from the image carrier by:
  (i) optically inverting substantially congruent segments of the line of image-bearing radiation to form a plurality of images of inverted line segments using separate inverting optics for each substantially congruent segment;

(ii) sensing radiation from and providing output data for each image of the plurality of images of inverted line segments using a separate light sensor element of a sensor formed from an array of light sensor elements; and (iii) forming a line of image data according to the output data for congruent images in the plurality of images of inverted line segments.

32. A method for obtaining a line of image data according to claim 31 wherein the step of forming a line of image data comprises the step of inverting the output data for each image in the plurality of images of inverted line segments.

33. A method for obtaining a line of image data according to claim 31 wherein sensing radiation comprises includes directing the images of the inverted line segment to the corresponding light sensor element of the array of light sensor elements.

34. A method for obtaining a line of image data according to claim 31 wherein the step of optically inverting substantially congruent segments comprises the step of providing greater than 1:−1 magnification.

35. A method for obtaining a line of image data according to claim 31 wherein the step of optically inverting substantially congruent segments comprises the step of providing less than 1:−1 magnification.

36. A method for obtaining a line of image data according to claim 31 further comprising the step of urging the surface forward incrementally in a direction that is substantially orthogonal to the line of image-bearing radiation.

37. A method for obtaining an image formed from successive lines of image data stored on a surface, comprising a repeated sequence of:

(a) emitting a line of stimulating radiation onto a stimulable image carrier on the surface, generating a line of image-bearing radiation thereby;

(b) generating image data from the line of image-bearing radiation excited from the image carrier by:

(i) optically inverting congruent segments of the line of image-bearing radiation to form a plurality of images of inverted line segments using separate inverting optics for each substantially congruent segment;

(ii) sensing radiation from, and providing output data for, each image of the plurality of images of inverted line segments using a separate light sensor element of a sensor having an array of light sensor elements; and (iii) forming a line of image data according to the output data for congruent images in the plurality of images of inverted line segments; and (c) urging the surface forward incrementally in a direction that is substantially orthogonal to the line of image-bearing radiation.

* * * * *